United States Patent
Clarkson et al.

(10) Patent No.: US 9,896,964 B2
(45) Date of Patent: Feb. 20, 2018

(54) CORE CASE HEATING FOR GAS TURBINE ENGINES

(71) Applicant: United Technologies Corporation, Farmington, CT (US)

(72) Inventors: Steven Clarkson, Cheshire, CT (US); Daniel K. Van Ness, II, Middletown, CT (US); Paul Thomas Rembish, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 361 days.

(21) Appl. No.: 14/969,774

(22) Filed: Dec. 15, 2015

(65) Prior Publication Data

US 2016/0169034 A1 Jun. 16, 2016

Related U.S. Application Data

(60) Provisional application No. 62/092,046, filed on Dec. 15, 2014.

(51) Int. Cl.
| | |
|---|---|
| *F01D 25/02* | (2006.01) |
| *F01D 25/24* | (2006.01) |
| *F01D 25/10* | (2006.01) |
| *F01D 21/10* | (2006.01) |
| *F01D 17/10* | (2006.01) |
| *B64D 27/10* | (2006.01) |
| *B64D 15/12* | (2006.01) |
| *B64D 29/00* | (2006.01) |
| *F02C 7/047* | (2006.01) |

(Continued)

(52) U.S. Cl.
CPC ............ *F01D 25/02* (2013.01); *B64D 15/12* (2013.01); *B64D 27/10* (2013.01); *B64D 29/00* (2013.01); *F01D 17/105* (2013.01); *F01D 21/10* (2013.01); *F01D 25/10* (2013.01); *F01D 25/24* (2013.01); *F02C 7/047* (2013.01); *F02C 7/05* (2013.01); *F04D 27/0215* (2013.01); *F04D 29/545* (2013.01); *F04D 29/584* (2013.01); *F04D 27/023* (2013.01); *F05D 2220/323* (2013.01); *F05D 2220/36* (2013.01); *F05D 2260/20* (2013.01); *F05D 2270/096* (2013.01)

(58) Field of Classification Search
None
See application file for complete search history.

(56) References Cited

U.S. PATENT DOCUMENTS

| 5,123,240 A | 6/1992 | Frost et al. |
| 2009/0260341 A1 | 10/2009 | Hogate et al. |

(Continued)

OTHER PUBLICATIONS

European Search Report for Application No. 15200193.9-1607—dated May 9, 2016; 9 pgs.

*Primary Examiner* — Jonathan M Dager
*Assistant Examiner* — Garrett F Evans
(74) *Attorney, Agent, or Firm* — Cantor Colburn LLP

(57) ABSTRACT

A case for a gas turbine engine includes a core body. The core body defines a longitudinally extending core flow path, a laterally extending bleed air duct coupling the core flow path in fluid communication with the external environment, and a structure-supporting member spanning the bleed air duct. A heating element is connected to the core body and is in thermal communication with the structure-supporting member.

20 Claims, 3 Drawing Sheets

(51) Int. Cl.
*F02C 7/05* (2006.01)
*F04D 29/54* (2006.01)
*F04D 29/58* (2006.01)
*F04D 27/02* (2006.01)

(56) References Cited

U.S. PATENT DOCUMENTS

| | | |
|---|---|---|
| 2013/0340440 A1 | 12/2013 | Leblance et al. |
| 2014/0245747 A1* | 9/2014 | Pritchard, Jr. ........ F01D 17/105 60/782 |
| 2014/0345294 A1 | 11/2014 | Urban et al. |

* cited by examiner

CORE CASE HEATING FOR GAS TURBINE ENGINES

CROSS REFERENCE TO RELATED APPLICATIONS

This application claims the benefit of U.S. Provisional Patent Application Ser. 62/092,046 filed on Dec. 15, 2014 the entire contents of which are incorporated herein by reference thereto.

BACKGROUND OF THE DISCLOSURE

1. Field of the Disclosure

The present disclosure relates to gas turbine engines, and more particularly to heated cases housing gas turbine engine rotating components.

2. Description of Related Art

Gas turbine engines commonly include a compressor section with two or more compressor stages ordinarily sealed from the external environment. Under certain circumstances, it can become necessary to bleed compressed air from the compressor section to the external environment, typically through bleed air ducts defined through the case housing the compressor section. This can be necessary to adjust airflow and pressure ratio of fluid traversing the compressor section stages. Bleeding compressor airflow can also allow foreign material ingested by the compressor section, such as rain, ice, or hail, to be extracted from air traversing the compressor stages.

Some engine cases include ducts arranged about an annulus of the case. Valves coupled to the ducts selectively place the core interior in fluid communication with the external environment for bleeding airflow from the compressor section. Under certain operational conditions, portions of the case bounding the bleed air ducts can collect foreign material extracted from the core flow path, potentially blocking such ducts or causing the foreign material to be passed back to the compressor.

Such conventional methods and systems have generally been considered satisfactory for their intended purpose. However, there is still a need in the art for improved gas turbine engine cases. The present disclosure provides a solution for this need.

SUMMARY OF THE DISCLOSURE

A case for a gas turbine engine includes a core body. The core body defines a longitudinally extending core flow path, a laterally extending bleed air duct coupling the core flow path in fluid communication with the external environment, and a structural member spanning the bleed air duct. A heating element connects to the core body and is in thermal communication with the structural member.

In certain embodiments, the heating element can be disposed within a bore defined within the core body. The bore can be defined within in a forward segment, an aft segment, or the structural member of the core body. The bore can have an orientation with a longitudinal, lateral or circumferential component relative to engine rotation axis within the core body. The heating element can include a resistive heating element, such as a cartridge type heating element, and can seat within the bore such that it is in thermal communication with a core flow path-facing surface of the structural member.

It also contemplated that, in accordance with certain embodiments, the heating element can overlay at least a portion of the core body. The heating element can overlay an exterior surface of the forward segment, the aft segment, of an exterior surface of the bleed air duct extending radially outward from the core body. The heating element can overlay an interior surface of forward segment, the aft segment, or structural member of the core body. The heating element can also overlay an inlet portion of the bleed air duct. It is further contemplated that the heating element can be thermal communication with a core flow path-facing surface of the structural member, and can include a heater mat type heating element.

It is further contemplated that, in certain embodiments, the bleed air duct can be an annulus dividing the core body into a forward segment and an aft segment. The structural member can span the annulus and couple the forward segment to the aft segment. The structural member can also divide the annulus into a plurality of circumferentially adjacent bleed air ducts. It is also contemplated that the structural member can also have a structural member surface with an aerodynamic surface facing the core flow path.

A system for heating a case for a gas turbine engine includes a case with a core body as described above, a processor operatively associated with the heating element, and a memory communicative with the processor. The memory has instructions recorded on the memory that, when read by the processor, cause the processor to determine the flight condition of an aircraft, compare the flight condition to a programmed condition, and change the amount of electrical power applied to the heating element, comparing the flight condition to the programmed condition operation to determine that the programmed flight condition is met.

A method of heating a gas turbine engine case includes applying electrical power to a heating element disposed on or within a body of an engine case. The method additionally includes heating, using the heating element, an interior surface of the body bounding a flow path disposed within the engine.

In embodiments, the method can include continuously heating the surface. In certain embodiments, the method can include selectively heating the surface. Selectively heating the surface can include determining a flight condition of an aircraft and comparing the flight condition to a programmed condition. When the comparison indicates that the programmed condition has been met, an amount electrical power applied to a heating element can be changed.

It is also contemplated that, in accordance with certain embodiments, the flight condition can be when hail or ice ingestion can be expected. The method can also include changing the amount of power can include increasing power applied when the programmed flight condition is met. The method can further include decreasing power applied when the programmed flight condition is not met.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE EMBODIMENTS

Figure 1:
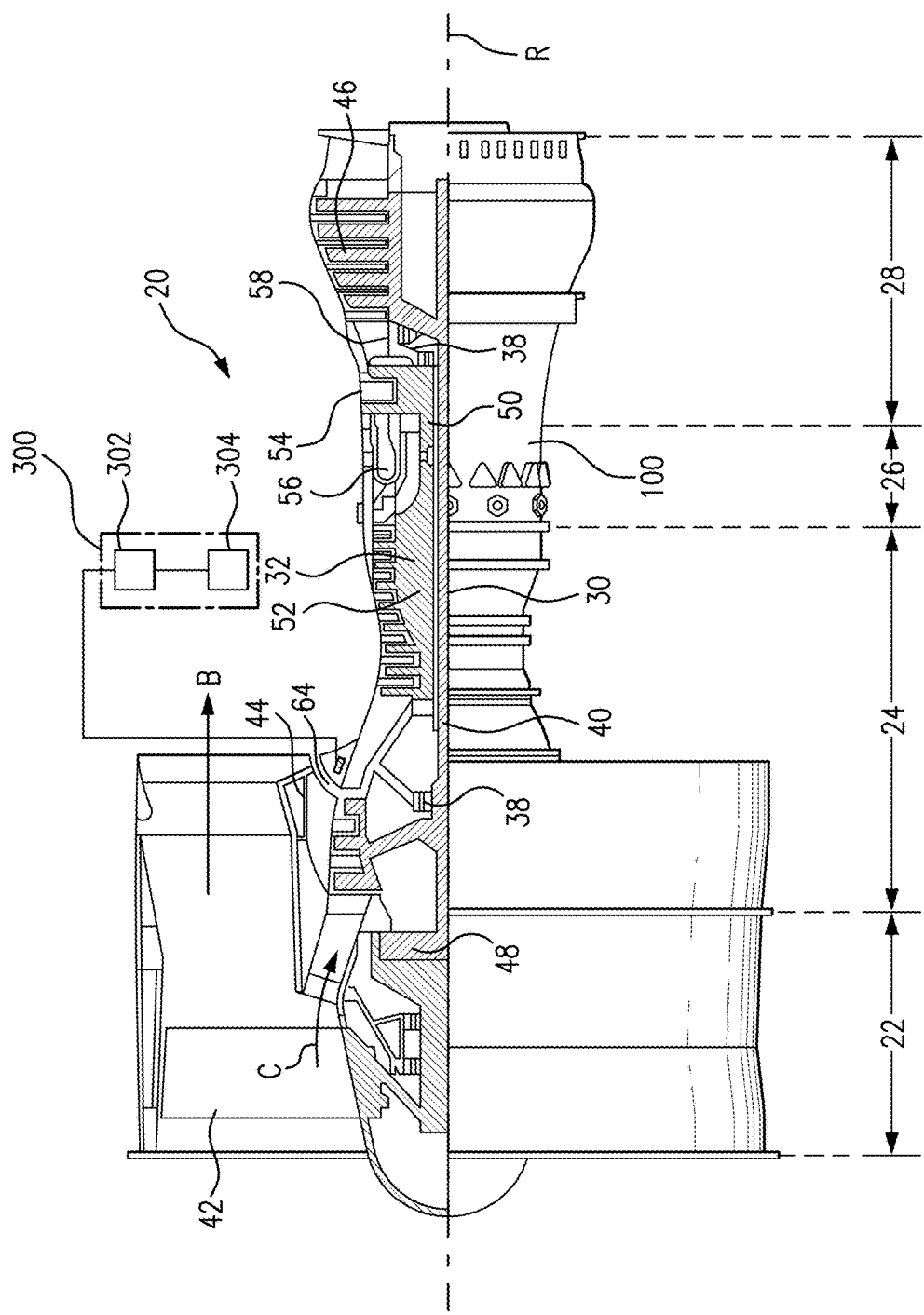
FIG. 1 is a schematic partial cross-sectional view of an exemplary embodiment of a gas turbine engine constructed in accordance with the present disclosure, showing a core case.

Reference will now be made to the drawings wherein like reference numerals identify similar structural features or aspects of the subject disclosure. For purposes of explanation and illustration, and not limitation, a partial view of an exemplary embodiment of a core case in accordance with the disclosure is shown in FIG. 1 and is designated generally by reference character 100. Other embodiments of core cases in accordance with the disclosure, or aspects thereof, are provided in FIGS. 2-4, as will be described. The systems and methods described herein can be used for aero and industrial gas turbine engines, such as aircraft main engines or auxiliary power units, and in power plants for electricity generation.

FIG. 1 schematically illustrates a gas turbine engine 20. Gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. Although gas turbine engine 20 is depicted as a geared turbofan gas turbine engine in the disclosed non-limiting embodiment, it should be understood that the concepts described herein are not limited to use with geared turbofans as the teachings may be applied to other types of turbine engines including three-spool turbofan engines or geared turbofans, or turboshaft engines.

Fan section 22 drives air along a bypass flow path B while compressor section 24 drives air along a core flow path C for compression and communication into the combustor section 26 and expansion through the turbine section 28. Gas turbine engine 20 generally includes a low speed spool 30 and a high speed spool 32 mounted for rotation about an engine rotation axis R relative to an engine core case 100 via several bearing systems 38. It should be understood that various bearing systems 38 at various locations may alternatively or additionally be provided.

Low speed spool 30 generally includes an inner shaft 40 that interconnects a fan 42, a low pressure compressor 44 and a low pressure turbine 46. Inner shaft 40 is connected to fan 42 through a geared architecture 48 to drive the fan 42 at a lower speed than low speed spool 30. Geared architecture 48 connects the low pressure compressor 44 to fan 42, but allows for rotation of low pressure compressor 44 at a different speed and/or direction than fan 42.

High speed spool 32 includes an outer shaft 50 that interconnects a high pressure compressor 52 and a high pressure turbine 54. A combustor 56 is arranged between high pressure compressor 52 and the high pressure turbine 54. A mid-turbine frame 58 disposed with engine core case 100 is arranged generally between the high pressure turbine 54 and the low pressure turbine 46. The mid-turbine frame 58 further supports bearing systems 38 in turbine section 28.

Inner shaft 40 and outer shaft 50 are concentric and rotate via bearing systems 38 about the engine rotation axis R that is collinear with their respective longitudinal axes. Core airflow C is compressed by low pressure compressor 44 then high pressure compressor 52, mixed and burned with fuel in the combustor 56, then expanded over the high pressure turbine 54 and low pressure turbine 46. High pressure turbine 54 and low pressure turbine 46 rotationally drive the respective low speed spool 30 and high speed spool 32 in response to the expansion.

Figure 2:
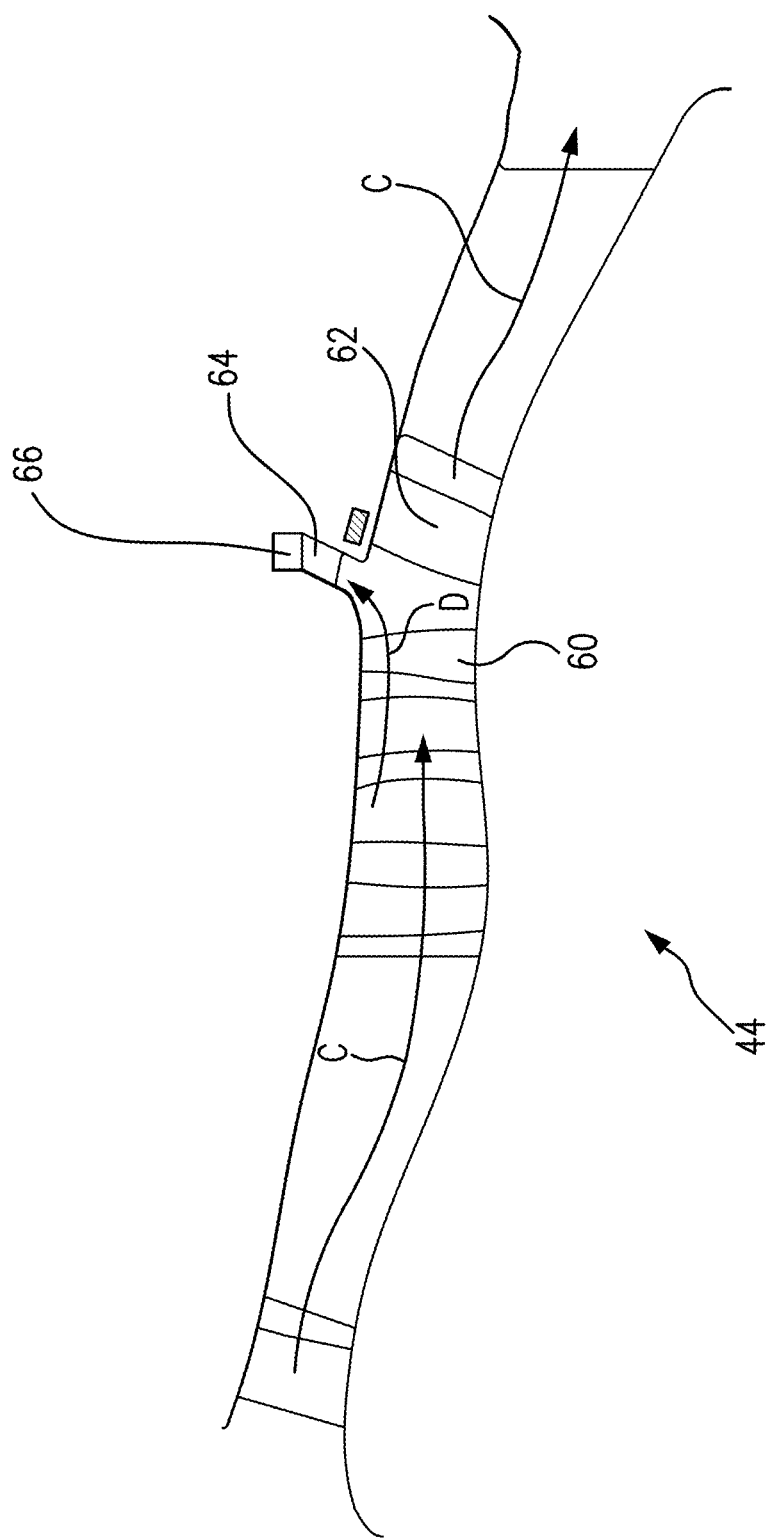
FIG. 2 is a cross-sectional view of a portion the gas turbine engine of FIG. 1, showing a bleed air duct extending from the core case interior to the external environment.

With reference to FIG. 2, a portion of low pressure compressor 44 is shown. Low pressure compressor 44 includes a rotor stage 60 and a stator stage 62 housed within engine core case 100. Rotor stage 60 is forward of stator stage 62 and upstream relative to core airflow C. Engine core case 100 defines a bleed air duct 64 between rotor stage 60 and stator stage 62. Bleed air duct 64 extends radially outward relative core flow path C and engine rotation axis R. A valve assembly 66 (shown schematically) is connected to bleed air duct 64 on a radially outer end of bleed air duct 64 that is configured and adapted to bleed air from between rotor stage 60 and stator stage 62 under predetermined conditions, such as matching airflow through low pressure compressor 44 and high pressure compressor 52 or extracting foreign material from core flow path C. In this respect valve assembly 66 includes a movable member (not shown for clarity reasons) with a first position, wherein substantially all air traversing low pressure compressor 44 along core flow path C is communicated to high pressure compressor 52 (shown in FIG. 1), and a second position wherein at least a portion of air traversing low pressure compressor 44 is communicated as a bleed airflow D to the environment external to engine core case 100 through bleed air duct 64.

Figure 3:
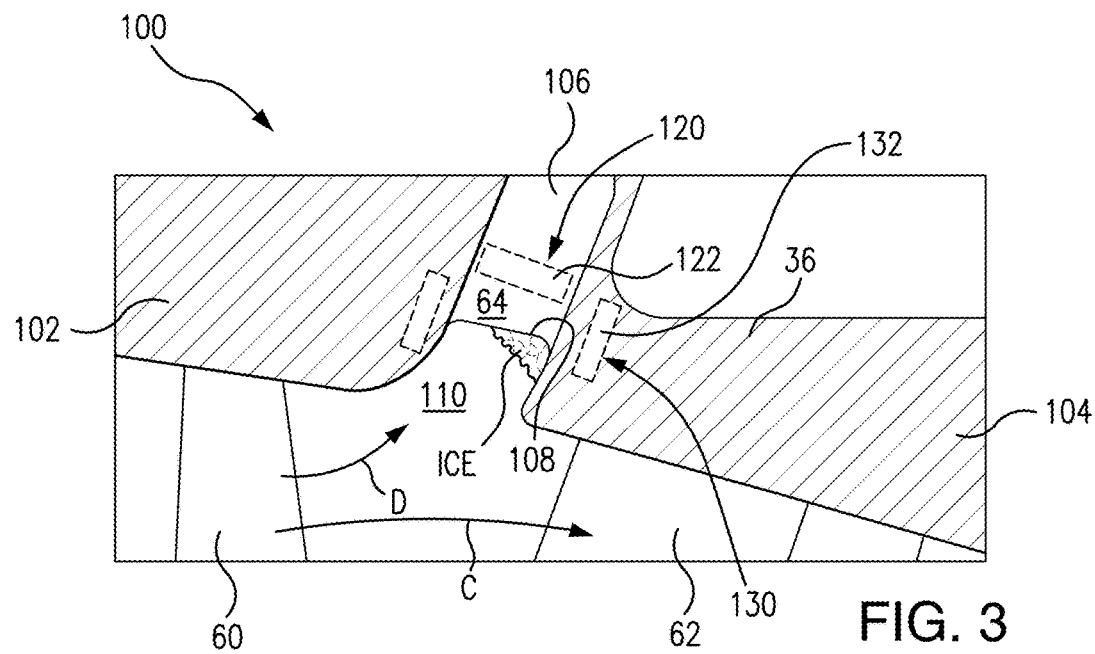
FIG. 3 is a cross-sectional view of a portion of the gas turbine engine of FIG. 1, showing cartridge type heating elements disposed within the core case bout the bleed air duct.

With reference to FIG. 3, engine core case 100 is shown. Engine core case 100 has a forward segment 102 and an aft segment 104 that define there between an annulus 110. Annulus 110 leads to a bleed air duct 64 and is spanned by a structure-supporting member 106. Structure-supporting member 106 couples forward segment 102 to aft segment 104. In embodiments, structure-supporting member 106 bounds a pair of circumferentially adjacent bleed air ducts. In certain embodiments, core case structure-supporting member 106 includes an aerodynamic surface bounding an interior of the core body.

An aft-facing edge of forward core case segment 102, core flow path-facing surface 108, and forward-facing edge of aft core case segment 104 bound an inlet of bleed air duct 64. As illustrated, bleed air duct 64 is located at an axial engine station disposed between low pressure compressor 44 and high pressure compressor 52 (shown in FIG. 1), i.e. a 2.5 bleed duct.

During operation in hail events valve assembly 66 can be opened to extract hail ingested by gas turbine engine 20. In this regard opening valve assembly 66 generates a bleed airflow D that flows through bleed air duct 64. Bleed airflow D extracts foreign material traversing compressor section 24 along core flow path C through bleed air duct 64 and into the environment external to gas turbine engine 20. Hail impinging a core flow path-facing surface 108 of structural member 106 can lower the temperature of the surface. The temperature drop can be sufficient such that hail and/or ice accumulate on core flow path-facing surface 108 instead of exiting the case through bleed air duct 64. Engine operating conditions can lower the temperature of the surface sufficient such that hail and/or ice can accumulate on the core flow path-facing surface 108. Under certain circumstances, accumulated ice and/or hail can also be returned to core flow path C.

Engine core case 100 includes one or more bores having one or more heating elements seated therein for heating core flow path-facing surface 108, thereby making it more difficult for ice and/or hail to accumulate on core flow path-facing surface 108. In this respect, core case structure-supporting member 106 defines a structural member bore 120 seating a heating element 122. Structural member bore 120 can have an orientation with an axial component relative to engine rotation axis R, for example being angled in relation thereto, or can be substantially parallel in relation to engine rotation axis R. This positions heating element 122 axially and substantially in parallel with core flow path-facing surface 108. It is to be understood and appreciated that bore 120 (and the cartridge type heating element seated therein) can have an orientation with a longitudinal, lateral, radial and/or a circumferential component relative to engine rotation axis R as suitable for an intended application for heating core flow path-facing surface 108.

Alternatively or additionally, core aft segment 104 also defines an aft segment bore 130 seating a heating element 132. Aft segment bore 130 is oriented radially relative to engine rotation axis R (shown in FIG. 1). The radially orientation positions heating element 132 substantially orthogonal relative to core flow path-facing surface 108. As above, bore 130 (and the cartridge-type heating element seated therein) can have an orientation with a longitudinal, lateral, radial and/or a circumferential component relative to engine rotation axis R as suitable for an intended application for heating core flow path-facing surface 108. It also to be appreciated and understood that forward segment 102 can also define a bore seating a cartridge-type heating element. Heating element 122 and/or heating element 132 can include a cartridge-type heating elements. In yet another alternative embodiment, the heating element or elements can, alternatively or additionally, be arranged such that it is located within another location of the bleed air duct 64 for example, proximate to an interface of a bleed air duct located within the fan bypass duct that exhausts to the atmosphere or to another region of the engine. Examples of suitable cartridge heater include OMEGALUX® CIR cartridge heaters, available from Omega Engineering Inc. of Stamford, Conn.

Figure 4:
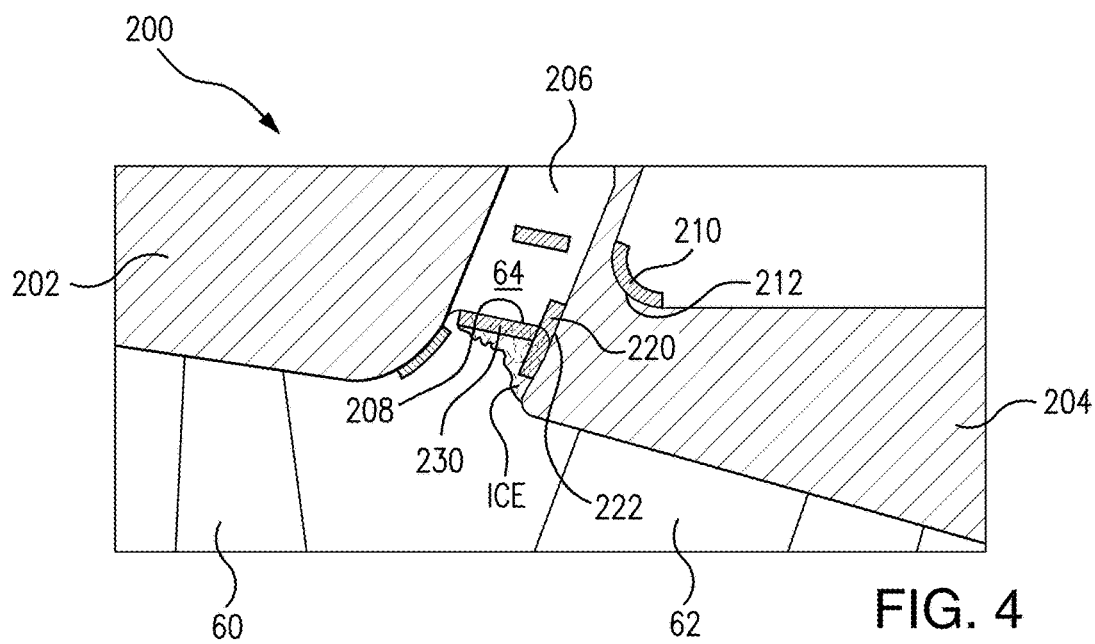
FIG. 4 is a cross-sectional view of a portion of the gas turbine engine of FIG. 1, showing heater mat type heating elements disposed over surfaces of the core case about the bleed air duct.

With reference to FIG. 4, an engine core case 200 is shown. Engine core case 200 is similar to engine core case 100 and additionally includes at least one surface heating element. At least one heating element can include a conformal heating element. The surface heating element can be arranged on an external or interior surface of core case 200. For example, a heating element 210 can be arranged on an external surface 212 of aft segment 204. Alternatively (or additionally), a heating element 220 can be arranged on interior surface 222 of aft segment 204. A heating element 232 can also be arranged on core path-facing surface 208 of structure-supporting member 206. As will be appreciated, surface heating elements can be arranged on interior and/or exterior surfaces of forward segment 202 as well as on an interior surface of bleed air duct 64, potentially heating directly surfaces susceptible to ice accumulation. In yet another alternative embodiment, the heating element or elements can, alternatively or additionally, be arranged such that it is located within another location of the bleed air duct 64 for example, proximate to an interface of a bleed air duct located within the fan bypass duct that exhausts to the atmosphere or to another region of the engine. Examples of suitable heating elements include OMEGALUX® silicone rubber flexible heaters, also available from Omega Engineering Inc. of Stamford, Conn.

With reference to FIG. 1, system 300 for heating a gas turbine engine core case is shown. System 300 includes a processor 302 and a memory 304. Processor 302 is operatively associated with heating element 122 and communicative with a memory 304. Memory 304 has instructions recorded thereon that, when read by processor 302, cause processor 302 to undertake certain actions. In particular, the instructions cause processor 302 to determine a flight condition of an aircraft, compare the flight condition of the aircraft to a programmed condition, and change the amount of power supplied to a heating element connected to core engine case 100 or engine core case 200 when the comparison indicates that the programmed flight condition is met.

For example, if the comparison indicates that an aircraft-mounted gas turbine engine 20 is beginning a descent from altitude to landing, processor 302 can increase power provided to the heating element to reduce the risk of hail or ice accumulations on core flow path-facing surface 108 (shown in FIG. 3). Alternatively, if the comparison indicated an aircraft-mounted gas turbine engine 20 is operating in icing or hailing conditions, processor 302 can increase power provided to the heating element to reduce the risk of hail or ice accumulation on core flow path-facing surface 108 (shown in FIG. 3). This can reduce or substantially eliminate accumulation of ice particles on core case structure-supporting members, allowing bleed air duct 64 to more efficiently extract hail from the core flow of path gas turbine engine 20. Heating core flow path-facing surface 106 can allow for operation of gas turbine engine 20 at power settings (i.e. rotation speeds) more favorable to engine efficiency rather than speeds favorable for hail extraction. It is further contemplated that the instructions can cause processor 302 to provide reduced, or substantially no power, to the element(s) when the comparison indicates that it is unlikely that gas turbine engine 20 will encounter hail.

The methods and systems of the present disclosure, as described above and shown in the drawings, provide for gas turbine engines with superior properties including improved efficiency during operation in environments where hail can be encountered. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A case for a gas turbine engine, comprising:
   a core body, including:
      a longitudinally extending core flow path;
      a laterally extending bleed air duct coupling the core flow path in fluid communication with the external environment;
      a structure-supporting member spanning the bleed air duct; and
   a heating element connected to the core body and in thermal communication with the structure-supporting member, configured to change an amount of heat output from the heating element if a programmed flight condition is met.

2. A case as recited in claim 1, wherein the structure-supporting member has a surface bounding the core flow path, wherein the heating element is coupled to the surface bounding the core flow path.

3. A case as recited in claim 1, wherein the core body defines a core body forward or aft segment coupled to the structure-supporting member, wherein the heating element is fixed to a surface of the forward or aft case segment bounding the bleed air duct.

4. A case as recited in claim 1, wherein the heating element is fixed to an exterior surface of the core body forward or aft of the structure-supporting member.

5. A case as recited in claim 1, wherein the structure-supporting member defines a structure-supporting member bore, wherein the heating element is seated in the bore.

6. A case as recited in claim 5, wherein the structure-supporting member bore extends axially relative to an axis of the core body.

7. A case as recited in claim 1, wherein the core body defines a bore forward or aft of the structure-supporting member, wherein the heating element is seated in the case bore.

8. A case as recited in claim 7, wherein the case bore extends radially relative to an engine rotation axis defined within the core body.

9. A case as recited in claim 1, wherein the heating element includes a resistive heating element.

10. A case as recited in claim 1, wherein the heating element includes a cartridge heater or a heater mat.

11. A case as recited in claim 1, wherein the structure-supporting member couples a core body forward segment to a core body forward or aft segment, wherein the structure-supporting member circumferentially divides the bleed air duct into first and second circumferentially adjacent bleed air ducts.

12. A case as recited in claim 11, wherein the structure-supporting member has a core flow path-facing surface for dividing airflow from the core flow path into a first bleed air duct flow and a second bleed air duct flow.

13. A system for heating a gas turbine engine case, comprising:
 a case core body, defining a longitudinally extending core flow path, a laterally extending bleed air duct coupling the core flow path in fluid communication with the external environment, and a structure-supporting member spanning the bleed air duct;
 a heating element connected to the core body and in thermal communication with the structure-supporting member;
 a controller operatively associated with the heating element;
 a memory communicative with the controller and having instructions recorded thereon that, where read by the processor, cause the processor to:
  determine a flight condition of an aircraft;
  compare the flight condition to a programmed condition to determine whether the preprogrammed flight condition is met; and
  change an amount electrical power applied to the heating element if comparing the flight condition to the programmed condition operation determines that the programmed flight condition is met.

14. A system as recited in claim 13, wherein the flight condition is operation in a portion of flight envelop where hail or ice ingestion is expected.

15. A system as recited in claim 13, wherein the flight condition is descent.

16. A system as recited in claim 13, where the flight condition is descent and hail or ice ingestion is expected.

17. A system recited in claim 13, wherein the change in the amount of electrical power includes (a) an increase in electrical power when the programmed flight condition is met, and (b) a decrease in electrical power when the programmed flight condition is not met.

18. A method of protecting a gas turbine engine, the method comprising:
 determining a flight condition of an aircraft;
 comparing the flight condition to a programmed condition;
 changing an amount electrical power applied to a heating element when comparing the flight condition to the programmed condition operation determines that the programmed flight condition is met; and
 wherein the heating element is in thermal communication with a structure-supporting member spanning a bleed air duct defined between forward and aft segments of gas turbine engine core body.

19. A method as recited in claim 18, wherein the flight condition is a flight condition where hail or ice ingestion is expected.

20. A method as recited in claim 18, wherein changing the amount of electrical power includes (a) increasing the electrical power applied to the heating element when the programmed flight condition is met, and (b) decreasing the electrical power applied to the heating element when the programmed flight condition is not met.

* * * * *